(12) United States Patent
Zacek (10) Patent No.: US 7,778,526 B2
(45) Date of Patent: Aug. 17, 2010

(54) SYSTEM AND METHOD FOR MAINTAINING DVD-SUBPICTURE STREAMS UPON CONVERSION TO HIGHER COMPRESSED DATA FORMAT

(75) Inventor: Olivier Zacek, Karlsbad (DE)

(73) Assignee: Nero AG, Karlsbad (DE)

( * ) Notice: Subject to any disclaimer, the term of this patent is extended or adjusted under 35 U.S.C. 154(b) by 1785 days.

(21) Appl. No.: 10/899,733

(22) Filed: Jul. 27, 2004

(65) Prior Publication Data

US 2005/0276580 A1 Dec. 15, 2005

Related U.S. Application Data

(63) Continuation-in-part of application No. 10/858,354, filed on Jun. 1, 2004, now abandoned.

(51) Int. Cl.
*H04N 7/26* (2006.01)
(52) U.S. Cl. .................. 386/111; 386/97; 386/95; 386/125; 386/126; 386/98; 386/105
(58) Field of Classification Search ................ 386/111, 386/97, 95, 98, 47, 125, 126
See application file for complete search history.

(56) References Cited

U.S. PATENT DOCUMENTS

| | | | | |
|---|---|---|---|---|
| 5,280,572 A | * | 1/1994 | Case et al. | 369/47.16 |
| 5,448,368 A | * | 9/1995 | Rijckaert et al. | 386/95 |
| 5,598,276 A | * | 1/1997 | Cookson et al. | 386/46 |
| 5,850,500 A | * | 12/1998 | Hirayama et al. | 386/97 |

FOREIGN PATENT DOCUMENTS

WO 2004036574 * 4/2004

* cited by examiner

*Primary Examiner*—Thai Tran
*Assistant Examiner*—Helen Shibru
(74) *Attorney, Agent, or Firm*—Harness, Dickey & Pierce, P.L.C.

(57) ABSTRACT

A system and method for generating a file container, the file container having a main structure for sample data and substructures for information data wherein the structures are defined in accordance with a standard of the second format, the standard defining a fixed number of data handler types, each data handler type declaring a process by which sample data are to be presented; converting the audio/video data to the second format including the step of generating audio/video sample data from the audio/video data and information on position and size of the audio/video sample data within the main structure; storing the audio/video sample data in the main structure, wherein the information on position and size of the audio/video sample data within the main structure is stored in a substructure for audio/video data; defining a substructure for subpicture data in accordance with the standard such that the subpicture data are storable as subpicture sample data in the main structure, wherein the substructure for subpicture data is adapted for providing information on position and size of the subpicture sample data, and is adapted for presenting a data handler type being undefined in the standard; converting the subpicture data to the second data format; and storing subpicture sample data in the main structure, and storing information on position and size of the subpicture sample data in the substructure for subpicture data.

32 Claims, 3 Drawing Sheets

SYSTEM AND METHOD FOR MAINTAINING DVD-SUBPICTURE STREAMS UPON CONVERSION TO HIGHER COMPRESSED DATA FORMAT

CROSS-REFERENCE TO RELATED APPLICATIONS

This application is a continuation-in-part of pending application Ser. No. 10/858,354, filed Jun. 1, 2004.

FIELD OF THE INVENTION

The present invention relates to a method for converting data in a computer system, the data including at least audio/video data provided in a first data format and temporally correlated subpicture data in a second data format, to data of a third data format.

The present invention further relates to a computer system, a computer readable medium, a transmission signal, and a software tool for carrying out the above conversion method as well as a decoder including a parser.

The present invention relates to DVD-video backup solutions in general, and particularly to copying DVD-video disks. One commonly used DVD-video backup solution is to convert the DVD-video content to another format which offers higher compression efficiency, wherein existing audio/video container formats such as AVI (Audio Video Interleave) are used for encapsulating the result. The conversion of the audio data and video data generally does not cause any problem, however, preserving subtitles present on the original DVD-video disk is problematic for the reasons as will be explained below.

BACKGROUND OF THE INVENTION

New data compression methods allow an efficient compression of large data sets generally occur with respect to movies which in turn are, for example, available on DVD disks. Effectively transferring and storing these huge data sets practically requires compression.

According to recent state of the art, video signals are recorded and reproduced in a rapid sequence of individual images. In television's PAL standard there are 25 images per second, or 50 half-images. In NTSC standard there are 30 images per second, each image can be divided into lines and transferred sequentially.

Previous compression methods are based essentially on the reduction of resolution, color depth and number of images per second. With digital compression, e.g. MPEG methods, merely differential images instead of complete images are transferred, i.e. merely the differences of individual image points (pixels) compared to previous images are transferred.

MPEG ("Motion Picture Expert Group") established an open and timely international standard addressing the needs of emerging audiovisual applications which demanded interworking. For example, the explosion of World. Wide Web (Internet) and acceptance of its interactive mode of operation has clearly revealed that traditional television paradigm were no longer suffice for audiovisual services. Users want to have access to audio and video as they now have access to text and graphics. This requires moving pictures and audio of acceptable quality at low bit rates.

The MPEG standard meanwhile is classified into MPEG-1, MPEG-2, and MPEG-4.

MPEG-1 was designed for fluid video playbacks. The MPEG-1 compression and decompression was originally a hardware-dependent method. The essential difference between MPEG-1 and MPEG-2 is that MPEG-2 can much better handle interlaced scanning, a method used in television. MPEG-2 provides compression to highest levels of quality so that movie material can be processed and edited almost one-to-one in studio quality. Consequently, MPEG-2 established itself as common standard and is nowadays used as standard format with DVD-video disks.

MPEG-4 format is a further development of the MPEG-2 format. Although MPEG-4 was originally intended as coding standard for audiovisual data having very low bit rates, its development served far more purposes than merely streaming of linear media data in Internet and wireless applications. Additionally, the compression rate of MPEG-4 is higher than MPEG-2. Further, it includes H.264 (i.e. MPEG4 part 10) as well.

Normally, movies are stored as MPEG-2 files on DVDs. Movie DVDs are comparable to common DVD-ROMs having a predetermined directory and file structure (architecture).

Players for DVD-video files recognize DVD-video data by a directory including the name VIDEO_TS. This directory contains all files relevant for playback. In the directory VIDEO_TS files have one of the following three file endings. Each index file has an extension '.IFO' which is related to a corresponding backup with an ending '.BUP'; actual video data, i.e. also all menus and still frames, are contained in files with ending '.VOB' (Video Object).

VOB files can contain also audio data, subpictures and navigation instructions.

For example, subpictures are bitmaps having two bits of color depth, which may represent simple graphics or subtitles. A typical example of subpictures are selection markings in DVD menus being half transparent. These bitmaps are overlaid with the video data.

The VOB file stores all these data parallely beside up to eight audio tracks, maximally 32 subpictures as well as information for navigation. DVD videos store all video and audio streams in video objects files having endings '.VOB'. A VOB file can be divided into interleaved video units (ILVU) which consists again of video object units (VOBU). A group of pictures (GOP) being contained therein summarizes the actual video and audio stream packet-by-packet.

The interleaved video units, which consist again of video object units as well as, partially, of a navigation packet (NV_PCK) and a GOP, i.e. the actual raw data. The NV_PCK contains positioning data and informs the player, among other things, about possible jump labels, and further contains various timing information.

GOPs divide into packets sized 2 KByte. A demultiplexer of the player joins these packets to continuous data streams: Video packs (V_PCK), audio packs (A_PCK), and subpicture packs (SP_PCK).

The GOP organization results from the structure of the video data. The MPEG-2 compression method limits the difference formation between frames (stored in predictive and/or bidirectional frames) within a GOP. Thus each GOP begins with a I-frame (Intra Frame) and ends usually in front of the next I-frame.

The DVD format is one of the formats which allows definition of its own subtitle format being compatible with its own audio/video container format. Other common audio/video container formats such as Audio-Video Interleave (AVI) or ISO/IEC 14496-1 (MPEG-4) do not provide specific media tracks for holding subpicture information.

To a certain extent, MPEG-4 does provide a way to include subpicture information by using the so-called BIFS (Binary Format for Scenes) script language. However, this script language is very complex for supporting in its completeness. Further, it contains subtitle information in form of text (letters) thereby causing disadvantages which will be discussed below.

As already stated above, subpicture information may be stored on DVD disks as compressed bitmaps along with timing and control information. Therefore, subtitles, if any present, are represented as images and not in the form of text. This makes it easy to represent any type of character alphabet such as Chinese characters.

Current solutions for preserving subtitle/overlay information from a DVD video disk during generation of a backup are based on coupling an audio/video container file to a second subtitle overlay information file.

Figure 1:
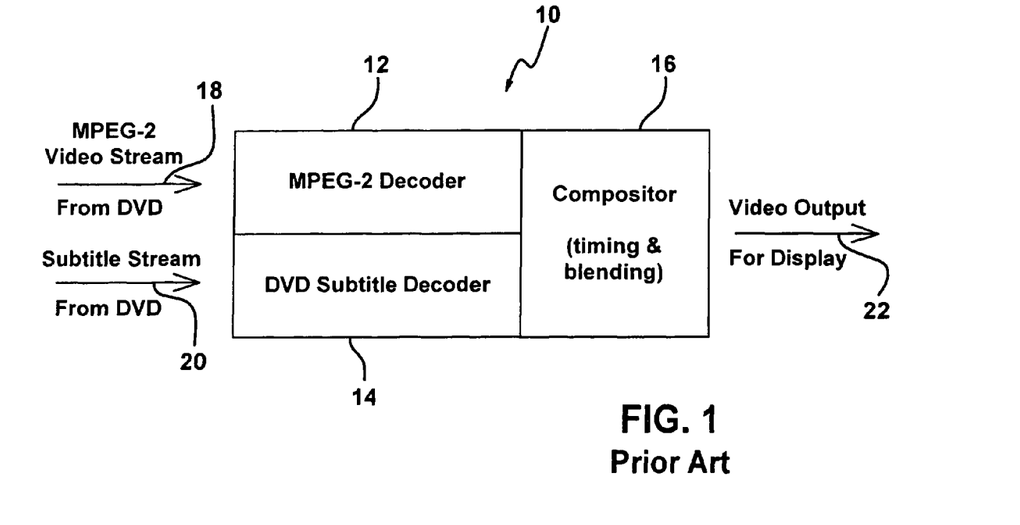
FIG. 1 shows a video decoder according to prior art.

In FIG. 1 a known video decoder 10 is shown during a conventional operation of DVD playback.

The decoder 10 comprises a MPEG-2 decoder 12, a DVD-subtitle (subpicture) decoder 14 as well as a compositor 16. The compositor 16 takes care of timing and performs the blending of subpicture (here subtitle) information with a video stream 18 which is decoded by the MPEG-2 decoder 12. A subtitle stream 20 from a DVD disk which is provided in bitmap format is decoded by the DVD-subtitle decoder 14. The compositor 16 joins the decoded. MPEG-2 video stream 18 and the decoded subtitle stream 20 in a timely correct manner and overlays the streams for producing a video output stream 22 to be displayed to a user.

In prior art, parallel to the conversion of DVD-video data from MPEG-2 format to MPEG-4 format, generation of the subtitle file is based on one of the following approaches.

According to a first approach, hereinafter called "timed bitmap sequence approach", the original subpicture data from the DVD is decoded, and decoded results in form of reconstructed bitmaps are saved along with time stamps in a file which is separate to the MPEG-4 file which contains the video data. The time stamps are used for temporarily correlating corresponding subpictures and video frames. However, it is a drawback of this approach that huge amounts of data storage are required for the subtitle file. Further, it is disadvantageous that the video decoder 10 must be able to support (interpret) one of numerous existing subtitle file formats as currently up to 20 different file formats exist. This makes it very difficult for video decoders to provide complete subtitle support.

According to a second approach, hereinafter called "first timed text data approach", the original subpicture data, i.e. the subtitle, is decoded, bitmaps are reconstructed, OCR (Optical Character Recognition) is applied to the reconstructed bitmaps for generating text data, and the text data resulting from the OCR is saved along with time stamps.

According to a third approach, hereinafter called "second time text data approach", the original subpicture data is decoded, bitmaps are reconstructed, and a person (manually) transcripts the text information by looking at all the bitmaps and writing down the textual information. Again, the resulting text data is saved along with time stamps.

One disadvantage of the second and third approach is that all the subtitle formats which are text-based do not allow to preserve non-Roman alphabets. This renders, for example, the second approach useless since in many regions of the world including Europe non-Roman alphabets are used such as Greek and Cyrillic alphabet.

Another disadvantage is that the subtitle information cannot be saved as part of the audio/video container file, i.e. the entire presentation information (audio, video, subpicture and timing) is not self-contained but spread across two files.

Therefore, it is an object of the present invention to provide a method by which data including audio/video and subpicture or subtitle data may be converted to another data format of higher compression efficiency wherein the resulting data can be decoded, and therefore displayed, in a much easier way.

Further, it is required to provide an easy integration into existing DVD-capable video decoders as well as a seamless integration into existing audio/video containers, preserving the container format compatibility.

SUMMARY OF THE INVENTION

According to a first aspect of the present invention a method for converting data in a computer system is disclosed, the data including at least audio/video data being provided in a first data format and temporarily correlated subpicture data in a second data format, to data of a third data format, comprising the steps of: generating a file container, the file container having a main structure for sample data and substructures for information data wherein the structures are defined in accordance with a standard of the second format, the standard defining a fixed number of data handler types, each data handler type declaring a process by which sample data are to be presented; converting the audio/video data to the second format including the step of generating audio/video sample data from the audio/video data and information on position and size of the audio/video sample data within the main structure; storing the audio/video sample data in the main structure, wherein the information on position and size of the audio/video sample data within the main structure is stored in a substructure for audio/video data; defining a substructure for subpicture data in accordance with the standard such that the subpicture data are storable as subpicture sample data in the main structure, wherein the substructure for subpicture data is adapted for providing information on position and size of the subpicture sample data, and is adapted for presenting a data handler type being undefined in the standard; converting the subpicture data to the second data format; and storing subpicture sample data in the main structure, and storing information on position and size of the subpicture sample data in the substructure for subpicture data.

By finding a substructure for subpicture data, particularly for subtitle data, in accordance with the standard, particularly with ISO/IEC 14496-1 (MPEG-4), such that the subpicture data are storable as subpicture sample data in the main structure wherein the substructure for subpicture data is adapted for providing information on position and size of the subpicture sample data, and is adapted for presenting a data handler type being undefined in the standard allows the "merging" of audio/video data and subpicture data in one single file (container). It is not necessary anymore to provide two separate files, one for the audio/video data and one for the subpicture data, thereby eliminating the need of 10 to 20 different interpreters for subtitle format.

Since in the data format's standard a predetermined number of handler types, such as a video handler for video data or an audio handler for audio data, the present invention defines a new handler type which is commonly not used in the standard.

Therefore, a MPEG-4 file parser, being preferably adapted to this new handler type, can retrieve the subpicture data from the MPEG-4 file, particularly from the MPEG-4 file container. The MPEG-4 parser can read samples of any kind of track by looking up a table in which the sample data position within the file and its size is placed. The MPEG-4 file parser is able to find all necessary information on data placement within the MPEG-4 file container in this table.

Thus, the conventional DVD subtitle decoder is not needed any longer. The MPEG-4 decoder itself handles the tasks of providing audio/video data as well as subpicture data.

According to a preferred embodiment the first data format is MPEG-2, the third data format is MPEG-4 and the second data format is bitmap, wherein the standard is ISO/IEC 14496-1. The main structure of the file container includes a plurality of top level atoms, wherein atoms are capable of containing other atoms. The top level atoms are of the type 'moov', 'mdat', 'free', or 'skip'. The sample data are stored in the top level atoms of the type 'mdat'. The substructure for subpicture data includes sublevel atoms of the 'moov'-atom type.

According to a further preferred embodiment, the substructure for subpicture data is a sublevel atom of type 'hdlr' which represents a null-terminated string.

According to a still further preferred embodiment, the method further comprises the step of decoding the data to be converted, at first. Moreover, the file container can be stored on a computer readable storage medium after conversion of the data. Additionally, dummy subpicture sample data can be generated for audio/video data which are not correlated with subpicture data in order to provide a gap-free subpicture stream.

According to a still further preferred embodiment, the step of converting the subpicture data to the second data format includes generating subpicture sample data and information on position and size of the subpicture sample data.

According to a second aspect of the present invention, a computer system having a central processing unit and storing member is adapted for carrying out the method according to the first aspect of the invention.

According to a third aspect of the present invention, a computer readable medium is disclosed for carrying out the method according to the first aspect of the invention.

Moreover, according to a fourth aspect of the present invention, a signal is disclosed for being transmitted over the Internet comprising instructions for carrying out the method according to the first aspect of the present invention.

Additionally, according to a still further aspect of the present invention, a software tool for carrying out the method according to the first aspect of the invention is disclosed.

It is to be understood that the features mentioned before and those still to be explained below can be utilized not only in the combination mentioned, but also in other combinations or in isolation, without leaving the scope of the present invention.

BRIEF DESCRIPTION OF THE FIGURES

The invention itself, together with further objects and attendant advantages, will best be understood by reference to the following detailed description, taken in conjunction with the accompanying drawings, in which.

DESCRIPTION OF PREFERRED EMBODIMENTS

As discussed above, one of the main goals of the present invention is to provide ease of integration of a highly compressed data file including subpicture data such as subtitle data into existing DVD-capable video decoders.

Figure 2:
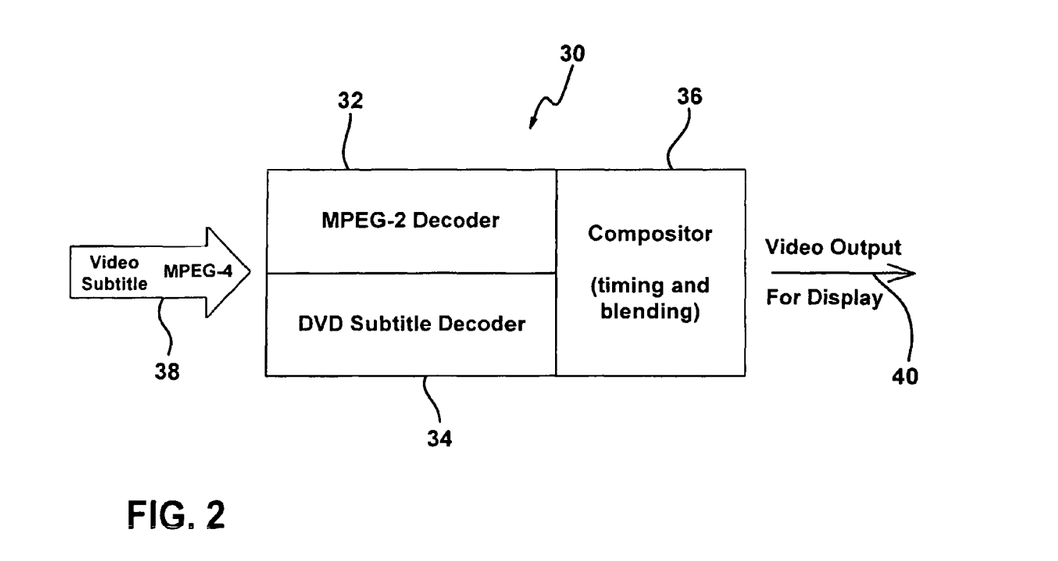
FIG. 2 shows a video decoder according to an embodiment of the present invention.

According to the present invention, a video decoder 30 as shown in FIG. 2 including an MPEG-4 decoder, DVD subtitle decoder 34, and compositor 36 receives an MPEG-4 file (container) which contains audio/video data as well as, for example, subtitle data. The decoded data are then output as video output 40 to be displayed.

The first goal is achieved by preserving an original DVD subpicture stream unaltered within an, for example, ISO/IEC 14496-1 (MPEG-4) container.

Figure 3:
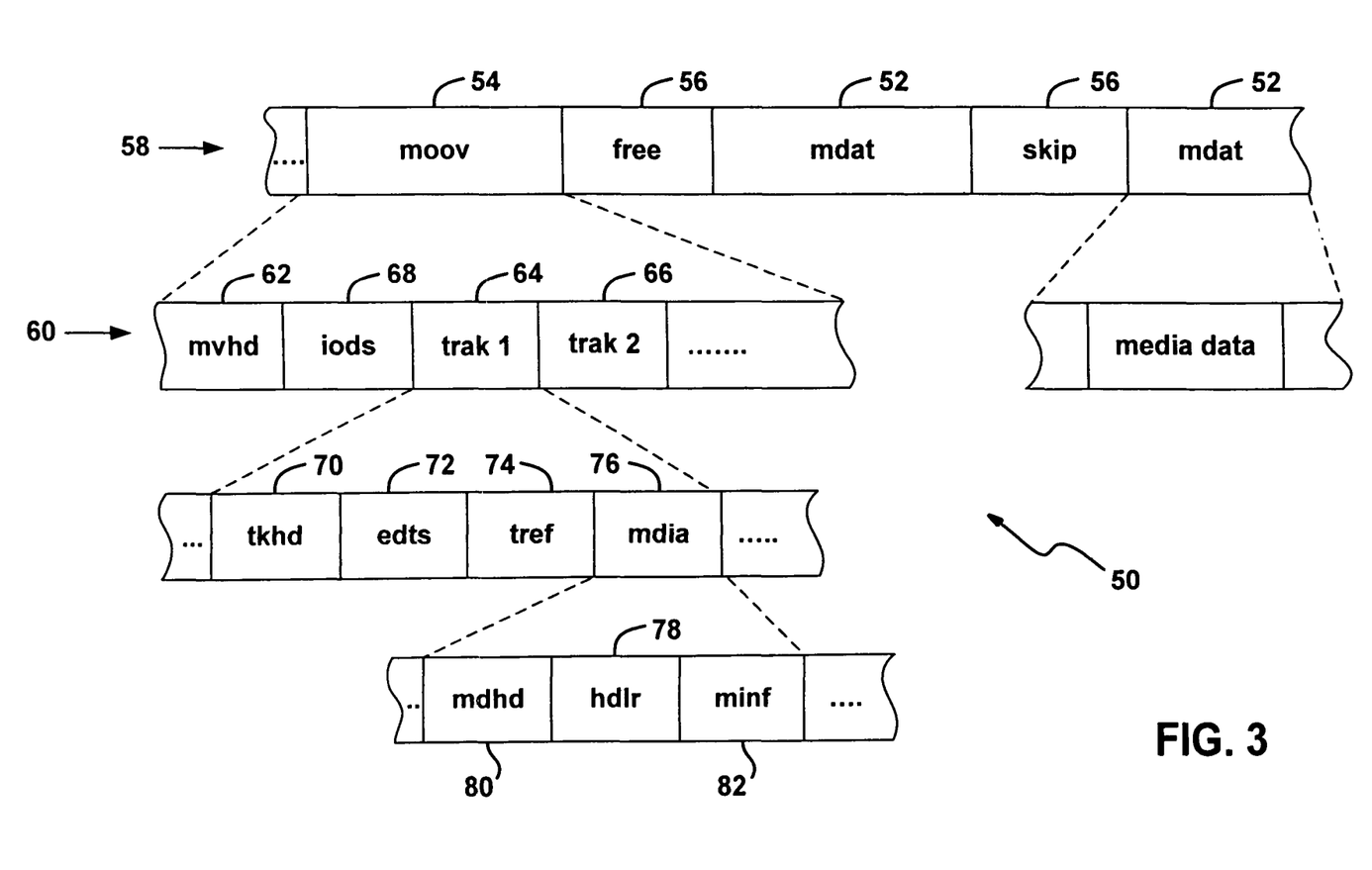
FIG. 3 shows the file structure according to the present invention.

Such an MPEG-4 container is shown in FIG. 3 and designated With reference numeral 50. In the following the description of the present invention will be given using MPEG-4 as an example with respect to both the data structure and standard of format. As will be appreciated it is clear to a person skilled in the art to transform the teaching set forth below to other data formats and standards such as AVI etc.

FIG. 3 is intended to introduce the concept underpinning the physical structures in an MPEG-4 file, also called MP4 file.

A presentation, such as a DVD movie, which is stored in the MPEG-2 file format on a DVD-video disk may be contained in several files.

All data stored in MP4 files is organized in atoms. An atom is a container that has an explicit type and length. Synchronization points can be found in a table stored in each track which is contained within an atom of type stss, stss being an atom type defined according to the ISO/IEC 14496-1 standard.

Atoms can contain other atoms. Typically, an atom either serves as a container or has fields that define particular concepts, although this is not a general rule. Any media data (sample) is stored in a media data atom of type mdat 52 (cf. FIG. 3). The media data is composed of access units (AU). Elementary stream (ES) data is partitioned into access units. An access unit is the smallest data entity to which timing information can be attributed. An elementary stream (ES) is streaming data received at the output of a decoding buffer. Elementary streams are produced and consumed by compression layer entities (encoders and decoders, respectively). ISO/IEC 14496 assumes that the integrity of an elementary stream is preserved from end to end.

Media data mdat 52 can, for example, contain frames of video, frames of audio etc.

In the file format, for each track an entire ES-descriptor is stored as sample description or descriptions. An access unit must be stored as a contiguous set of bytes. The file format can describe and use media data stored in other files, however, this restriction still applies.

In ISO/IEC 14496 there is another type of data, the so-called metadata. Metadata represent description and logical dependencies of the elementary streams (e.g. object description and other description). The metadata is contained within a metadata wrapper, i.e. a movie atom 54. The media data may be contained either in the same file, within media data atom(s), or in other files. The media data objects (or media data file) may contain other unreferenced information.

All the metadata in a presentation such as a movie on a DVD video disk, is stored in the movie structure, i.e. an atom of type moov. Unused space in the file 50 is designated with an atom 56 of type free or skip.

The three atom types mdat, moov, and free are atoms occurring at a top level 58 of the file 50. Within these atom types, only the moov atom 54 has an internal structure. Inside the mdat atom 52, the media data itself is stored.

The moov atom 54 has a substructure 60. In FIG. 3, this is illustrated by broken lines extending from bottom corners of the atom 54 of the type moov. This structure can further be taken from Table 1 below.

actual time stamps, the time stamps must be computered. This computation proceeds in three steps.

If a track has an edit list (as track 64 has an edit list edts 72), this list is used to build an overall time map of the stream

TABLE 1

| Moov | | | | | | | | |
|---|---|---|---|---|---|---|---|---|
| | mvhd | | | | | | 13.2.3.1 | container for all the meta-data |
| | iods | | | | | | 13.2.3.3 | movie header, overall declarations |
| | trak | | | | | | 13.2.3.4 | object descriptor |
| | | tkhd | | | | | 13.2.3.4.2 | container for an individual track or stream |
| | | tref | | | | | 13.2.3.6 | track header, overall information about the track |
| | | edts | | | | | 13.2.3.7 | track reference container |
| | | | elst | | | | 13.2.3.25 | edit list container |
| | | mdia | | | | | 13.2.3.26 | an edit list |
| | | | mdhd | | | | 13.2.3.8 | container for the media information in a track |
| | | | hdlr | | | | 13.2.3.9 | media header, overall information about the media |
| | | | minf | | | | 13.2.3.10 | handler, at this level, the media (handler) type |
| | | | | vmhd | | | 13.2.3.11 | media information container |
| | | | | smhd | | | 13.2.3.12.1 | video media header, overall information (video track only) |
| | | | | hmhd | | | 13.2.3.12.2 | sound media header, overall information (sound track only) |
| | | | | <mpeg> | | | 13.2.3.12.3 | hint media header, overall information (hint track only) |
| | | | | dinf | | | 13.2.3.12.4 | mpeg stream headers |
| | | | | | | | 13.2.3.13 | data information atom, container |
| | | | | | dref | | 13.2.3.14 | data reference atom, declares source(s) of media in track |
| | | | | stbl | | | 13.2.3.15 | sample table atom, container for the time/space map |
| | | | | | | stts | 13.2.3.16.1 | (decoding) time-to-sample |
| | | | | | | ctts | 13.2.3.16.2 | composition time-to-sample table |
| | | | | | | stts | 13.2.3.21 | sync (key, l-frame) sample map |
| | | | | | | stsd | 13.2.3.17 | sample descriptions (codec types, initialization etc.) |
| | | | | | | stsz | 13.2.3.18 | sample sizes (framing) |
| | | | | | | stsc | 13.2.3.19 | sample-to-chunk, partial data-offset information |
| | | | | | | stco | 13.2.3.20 | chunk offset, partial data-offset information |
| | | | | | | stsh | 13.2.3.22 | shadow sync |
| | | | | | | stdp | 13.2.3.23 | degradation priority |
| mdat | | | | | | | 13.2.3.2 | Media data container |
| free | | | | | | | 13.2.3.24 | free space |
| skip | | | | | | | 13.2.3.24 | free space |
| udta | | | | | | | 13.2.3.27 | user-data, copyright etc. |

Table 1 gives an overview of atom encapsulation structure. In the first six columns from the left different atom types are illustrated. The top level atoms (cf. reference numeral 58 in FIG. 3) are located in the outermost column on the left side. Starting from this column sublevel atoms are shown with degrading priority.

In the outermost column on the right hand side of Table 1 a brief description of the various atom types is given. In the second column from the right hand side of Table 1 the chapter number of the respective atom type in ISO/IEC 14496 standard is given.

Returning to FIG. 3, the moov atom 54 contains a header atom mvhd 62 and then a set of tracks trak 1 64 and trak 2 66. The movie header mvhd 62 gives basic information about the presentation, for example, the date it was last edited or its overall duration. The meta data for each track is stored in an atom of type trak. Optionally an atom 68 of type iods can be provided inside the moov atom 54.

Like the movie atom moov 54, the trak atom 64, has, for example, a header atom tkhd 70. This header 70 contains the track identifier, the track's duration, and creation and modification stamps for this track. Each track has a time scale (not shown) which defines how fast its clock ticks. Using an appropriate time scale enables precise definition of timing. For example, usually the time scale of an audio track will be chosen to match its sampling rate for enabling sample-accurate timing (e.g., a time scale of 22,050 ticks per second for 22.05 kHz audio samples).

When a file is delivered, for example, as an MPEG-4 stream, the timing is conveyed by the MPEG-4 SL (Synchronization Layer, not shown). Since MP4 files do not record the times from the implicit time line of the sample times. Decoding time stamps of each AU is then computered by adding the durations of the proceeding samples in that track. This time is then mapped according to the edit list 72. If a track has explicit composition time information, it is represented by an offset from the decoding time computered in the step before. The composition of that must be added to the decoding for obtaining the composition time, and then again mapped through the edit list information (if any).

The edit list edts 72 is related to timing, as discussed above. Optionally, a track reference atom tref 74 is provided inside a track atom trak. The track reference atom 74 provides a reference from the containing stream to another stream in the presentation. These references are typed. Exactly one track reference atom 74 can be contained within one track atom trak.

Further provided inside a track atom is a media atom mdia 76. The media atom 76 in turn contains a handler atom hdir 78 as well as a media header mdhd 80 and a media information container minf 82. The media header 80 includes overall information about the media, and the minf atom 82 is a media information container.

The handler atom hdlr 78 within a media atom 76 declares the process by which the media data of mdat 52 in the stream may be presented, and thus the nature of the media in a stream. For example, a video handler would handle a video track. The handler information provides a first level of differentiation of the track. The handler type 78 identifies the general kind of information in a track, such as visual, audio, BIFS, and so on. A sample table (not shown in FIG. 3 but in Table 1 as stbl) provides detailed information about each sample, i.e. AU, within a track. It is structured as a set of atoms that are formatted as tables. These atoms define both the physical location of each sample (frame of video or subtitle overlay frame, for example) and its timing. To keep these tables compact, a variety of techniques is used. One that is used to compact the location and size information relies on the observation that several frames from the same track are often stored contiguously, even when data from various tracks is interleaved. This run of contiguous samples is also called a chunk. The sample-to-chunk table (cf. ftsc in Table 1) provides the mapping from sample number to chunk. The position of each chunk is recorded as a chunk offset (using 32 or 64 bits), which is measured from the beginning of the file in which the chunk resides. The length, in bytes, of each sample also is reported, in the sample size table. Therefore, by using the data reference from the track, chunk offset, and the size of the preceding samples in the same chunk, it is possible to find the data file containing the sample, which may be a file reference by the MP-4 file itself, the chunk within that file, the offset of the sample within the chunk, and the size of the sample itself.

In the MP-4 file format, determining how to decode track involves two levels of decisions. First it has to be decided which basic kind of track is it: audio, visual, and so on? Then, it has to be determined precisely how the samples are coded: What codec-MPEG-4 object type- and which parameters and settings (decoder-specific configuration) are used?

As already mentioned above, the first decision is made by examining the handler type 78. Along with the handler type 78, there is a type-specific header atom within the track structures for each kind of track. In ISO/IEC 14496 a fixed number of handler types and correspondingly type-specific header atoms is defined. Table 2 shows MP-4 handler and header atom types.

TABLE 2

| Stream type | Handler type | Header atom type |
|---|---|---|
| VisualStream | vide | vmhd |
| AudioStream | soun | smhd |
| ObjectDescriptorStream | odsm | nmhd |
| SceneDescriptionStream | sdsm | nmhd |
| MPEG7Stream | m7sm | nmhd |
| ObjectContentInformation | oscm | nmhd |
| IPMP Stream | ipsm | nmhd |
| MPEG-J Stream | mjsm | nmhd |
| Hint Track | hint | hmhd |
| ClockReferenceStream | crsm | nmhd |

Having thus clarified the structure of the file container 50 of FIG. 3, the conversion of a (compressed) subtitle or subpicture stream 20 (cf. FIG. 1) from a DVD video disk is exemplarily described in the following.

The handler type 78 is based on track identifiers (four character code) making it easy to define a new track type without interfering existing track readers. This means an unknown track type will simply be ignored. According to ISO/IEC 14496 (especially definition 13.2.3.10) all non-standard handler types like the one defined in Table 3 below are treated as simple samples.

TABLE 3

| Description | DVD-video subpicture format |
|---|---|
| moov.trak.mdia.hdlr.hndler-type | 'subp' |
| StreamType value | 0x38 (OverlayStream) |
| ObjectTypeIndication | 0xE0 (Overlay DVD-subpicture) |

Subpicture streams usually do not last the entire presentation period. Therefore, the data provider has to ensure that possible dummy/empty packets of subtitle data are provided such that there is no gap in time stamps. From the file point of view, the provided data should always be continuous. The subpicture track type of the present invention uses DVD-video compliant subpicture streams to carry out subpicture information. To support this new track type within the file container 50, values are defined as listed in Table 3 above.

The track dimensions contain the native subpicture stream size (720×480 for PAL or 720×576 for NTSC).

With other words, according to the present invention a DVD-video disk backup can be generated in a very easy manner. The DVD-video content which normally is provided as MPEG-2 audio/video data is converted to another video data, such as MPEG-4, having a higher compression efficiency. Subpicture data, such as subtitle data, which are normally provided in the bitmap format, are integrated into the file container by defining a new handler type. The new handler type to be defined should be undefined in the standard of the file container, i.e. data being labeled with the new handler type are not handled by a decoder of the higher compressed data format.

Therefore, by using the present invention it becomes possible to include subpicture data into a file container, and thereby to deliver only one single file, including both audio/video data and subtitle data, within a single file.

Hence, it becomes possible to easily integrate subtitle data into an existing audio/video container, which can be read by conventional DVD-capable video decoders.

Figure 4:
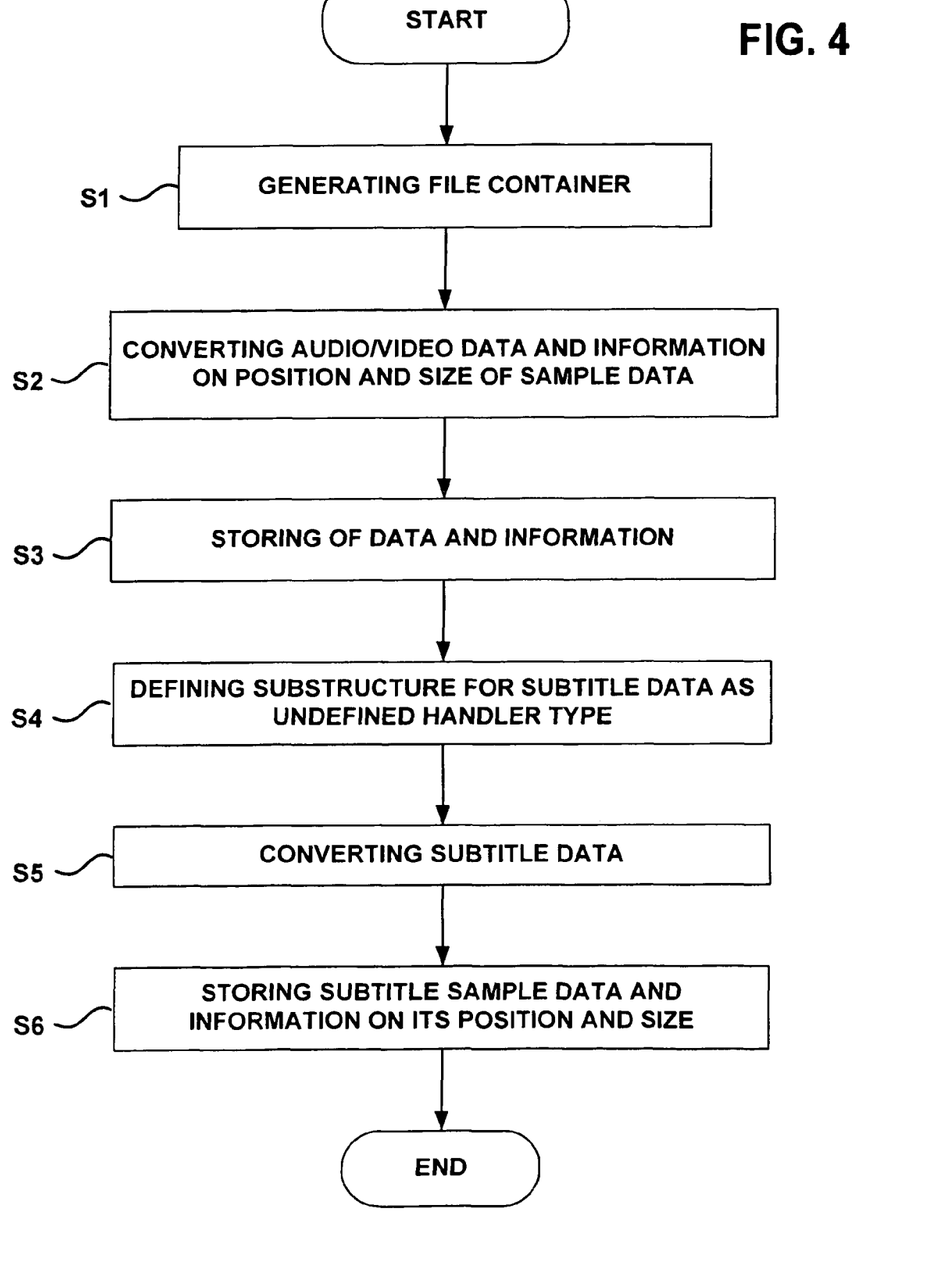
FIG. 4 shows a schematic flow chart illustrating the method for converting data according to the present invention.

Referring now to FIG. 4, a method for converting data according to the present invention is schematically shown.

At first, in step S1, a file container (cf. 50 in FIG. 3) is generated. The file container has a main structure (cf. reference numeral 58 in FIG. 3) for, among other things, sample data such as media data, and substructures for information data (metadata), wherein the structures are defined in accordance with a standard such as ISO/IEC 14496 (MPEG-4). Within the standard a fixed number of data handler types is defined. Each data handler type declares a process by which sample data are to be presented.

In step S2, the audio/video data, which are, as well as the subpicture data, included in the data to be converted, are converted to the second format by generating compressed audio/video sample data which are stored in the main structure, as well as information on position and size of the audio/video sample data is generated. The information on position and size of the audio/video sample data is stored as metadata.

In a further step S3, the audio/video sample data are stored in the main structure wherein the information on position and size of the audio/video sample data is stored within a substructure for audio/video data (cf., for example, field 64 in FIG. 3 designated trak 1).

In step S4 a substructure for subpicture data is defined in accordance with the standard such that the subpicture data are storable as subpicture sample data in the main structure, wherein the substructure for subpicture data is adapted for providing information on position and size of the subtitle sample data, and is adapted for presenting a data handler type being undefined in the standard.

In steps S5 and S6 the subpicture data is converted to the second data format, and the converted subpicture sample data is stored in the main structure, and the (converted) information on position and size of the subpicture sample data is stored in the substructure for subpicture data.

The present invention further discloses a computer system which is adapted for carrying out the method as described above. Further, the method according to the present invention can be implemented as a computer program product which is storable on a computer readable medium such as hard disks, floppy disks, DVD disks, CD ROMs and so on. Such a computer program product may be distributed over the Internet as a transmission signal for download. It can also be provided as part of an encoder (software tool) by which, for example, MPEG-4 file containers can be generated.

In MPEG-4, for example, all tracks have a table which relates sample numbers to positions in the file. To get subpicture sample data, it is proceeded just like for any other track type. It is looked into to 'stco' table to get the sample's data position within the file, and the 'stsz' table to obtain the sample's size.

It is not the task of the decoder to retrieve the subpicture data, but the task of a file parser. MPEG-4 file parsers can read and parse samples of any kind of track, always the same way, i.e., for example, by looking into the 'stco', 'stsz', 'stsc', 'stss' tables and/or possibly others, to find all necessary information about data placement within the file container. For the decoding also hardware such as an ASIC, DSP, etc. could be used.

It is necessary to adapt a parser in order to process subtitle data from a file container which was generated according to the present invention. After reading the detailed description of the file generation and conversation, respectively, it is clear to an expert how to adapt a parser module of a DVD decoder in order to allow the functionality of the present invention. This can be achieved by providing the parser with information on the new handler type.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A method for converting data, the method being performed by a computer system, the data including at least audio/video data being provided in a first data format and temporally correlated subpicture data in a second data format, to data of a third data format, comprising:
    generating a file container, the file container having a main structure for sample data and substructures for information data wherein the structures are defined in accordance with a standard of the second format, the standard defining a fixed number of data handler types, each data handler type declaring a process by which sample data are to be presented;
    converting the audio/video data to the second format including the step of generating audio/video sample data from the audio/video data and information on position and size of the audio/video sample data within the main structure;
    storing the audio/video sample data in the main structure, wherein the information on position and size of the audio/video sample data within the main structure is stored in a substructure for audio/video data;
    defining a substructure for subpicture data in accordance with the standard such that the subpicture data are storable as subpicture sample data in the main structure, wherein the substructure for subpicture data is adapted for providing information on position and size of the subpicture sample data, and is adapted for presenting a data handler type being undefined in the standard;
    converting the subpicture data to the second data format; and
    storing subpicture sample data in the main structure, and storing information on position and size of the subpicture sample data in the substructure for subpicture data.

2. The method of claim 1, wherein the subpicture data represent subtitle.

3. The method of claim 1, wherein the data to be converted is DVD-video data.

4. The method of claim 1, wherein the first data format is MPEG2.

5. The method of claim 1, wherein the third data format is MPEG4 and the second data format is 'bitmap'.

6. The method of claim 5, wherein the standard is ISO/IEC 14496-1.

7. The method of claim 5, wherein the main structure of the file container includes a plurality of top level atoms, wherein atoms are capable of containing other atoms.

8. The method of claim 7, wherein the top level atoms are of type 'moov', 'mdat', 'free' or 'skip'.

9. The method of claim 8, wherein the sample data are stored in top level atoms of the type 'mdat'.

10. The method of claim 9, wherein the substructure for subpicture data includes sub level atoms of the top level atoms of the type 'moov'.

11. The method of claim 10, wherein the substructure for subpicture data is a sub level atom of type 'hdlr' which represents a null-terminated string.

12. The method of claim 4, further comprising the step of decoding the data to be converted, at first.

13. The method of claim 1, wherein the third data format has a higher compression efficiency than the first data format.

14. The method of claim 1, further comprising the step of storing the file container on a computer readable storage medium after conversion of the data.

15. The method of claim 1, further comprising the step of generating dummy subpicture sample data for audio/video data which are not correlated with subpicture data in order to provide a gap-free subpicture data stream.

16. The method of claim 1, wherein the step of converting the subpicture data to the second data format includes generating subpicture sample data and information on position and size of the subpicture sample data.

17. Computer system having a central processing unit and storage member and being adapted for carrying out the following:
    generating a file container, the file container having a main structure for sample data and substructures for information data wherein the structures are defined in accordance with a standard of the second format, the standard defining a fixed number of data handler types, each data handler type declaring a process by which sample data are to be presented;
    converting the audio/video data to the second format including the step of generating audio/video sample data from the audio/video data and information on position and size of the audio/video sample data within the main structure;
    storing the audio/video sample data in the main structure, wherein the information on position and size of the audio/video sample data within the main structure is stored in a substructure for audio/video data;
    defining a substructure for subpicture data in accordance with the standard such that the subpicture data are storable as subpicture sample data in the main structure, wherein the substructure for subpicture data is adapted for providing information on position and size of the subpicture sample data, and is adapted for presenting a data handler type being undefined in the standard;

converting the subpicture data to the second data format; and storing subpicture sample data in the main structure, and storing information on position and size of the subpicture sample data in the substructure for subpicture data.

18. The system of claim 17, wherein the subpicture data represent subtitle.

19. The system of claim 17, wherein the data to be converted is DVD-video data.

20. The system of claim 17, wherein the first data format is MPEG2.

21. The system of claim 17, wherein the third data format is MPEG4, the second data format is 'bitmap', and the standard is ISO/IEC 14496-1.

22. The system of claim 21, wherein the main structure of the file container includes a plurality of top level atoms, wherein atoms are capable of containing other atoms, the top level atoms are of type 'moov', 'mdat', 'free' or 'skip', the sample data are stored in top level atoms of the type 'mdat', the substructure for subpicture data includes sub level atoms of the top level atoms of the type 'moov', and the sub level atoms being of type 'hdlr' which represents a null-terminated string.

23. The system of claim 20, further comprising the step of decoding the data to be converted, at first.

24. The system of claim 17, wherein the third data format has a higher compression efficiency than the first data format.

25. The system of claim 17, further comprising the step of storing the file container on a computer readable storage medium after conversion of the data.

26. The system of claim 17, further comprising the step of generating dummy subpicture sample data for audio/video data which are not correlated with subpicture data in order to provide a gap-free subpicture data stream.

27. A computer readable medium comprising instructions for carrying out a method comprising:

generating a file container, the file container having a main structure for sample data and substructures for information data wherein the structures are defined in accordance with a standard of the second format, the standard defining a fixed number of data handler types, each data handler type declaring a process by which sample data are to be presented;

converting the audio/video data to the second format including the step of generating audio/video sample data from the audio/video data and information on position and size of the audio/video sample data within the main structure;

storing the audio/video sample data in the main structure, wherein the information on position and size of the audio/video sample data within the main structure is stored in a substructure for audio/video data;

defining a substructure for subpicture data in accordance with the standard such that the subpicture data are storable as subpicture sample data in the main structure, wherein the substructure for subpicture data is adapted for providing information on position and size of the subpicture sample data, and is adapted for presenting a data handler type being undefined in the standard;

converting the subpicture data to the second data format; and storing subpicture sample data in the main structure, and storing information on position and size of the subpicture sample data in the substructure for subpicture data.

28. The computer readable medium of claim 27, wherein the subpicture data represent subtitle.

29. The medium of claim 27, wherein the third data format is MPEG4, the second data format is 'bitmap', and the standard is ISO/IEC 14496-1.

30. The medium of claim 29, wherein the main structure of the file container includes a plurality of top level atoms, wherein atoms are capable of containing other atoms, the top level atoms are of type 'moov', 'mdat', 'free' or 'skip', the sample data are stored in top level atoms of the type 'mdat', the substructure for subpicture data includes sub level atoms of the top level atoms of the type 'moov', and the sub level atoms being of type 'hdlr' which represents a null-terminated string.

31. A decoder comprising a parser module for processing input data in a format comprising a main structure for sample data and substructures for information data, wherein the structures are defined in accordance with a standard, the standard defining a fixed number of data handler types, each data handler type declaring a process by which sample data are to be presented, the main structure comprising audio/video sample data and subpicture sample data, wherein information on position and size of the audio/video sample data within the main structure is stored in a substructure for audio/video data, and wherein information on position and size of the subpicture sample data is stored in a substructure for subpicture data in accordance with the standard, wherein the substructure for subpicture data is adapted for presenting a data handler type being undefined in the standard;

wherein the parser module is adapted to the handler type being undefined in the standard, and wherein the parser module is adapted for retrieving the subpicture sample data and the information on position and size of the subpicture sample data from the input data.

32. Computer readable storage medium having stored thereon a file container, the file container comprising data in a format, the format comprising a main structure for sample data and substructures for information data, wherein the structures are defined in accordance with a standard, the standard defining a fixed number of data handler types, each data handler type declaring a process by which sample data are to be presented, the main structure comprising audio/video sample data and subpicture sample data, wherein information on position and size of the audio/video sample data within the main structure is stored in a substructure for audio/video data, and wherein information on position and size of the subpicture sample data is stored in a substructure for subpicture data in accordance with the standard, wherein the substructure for subpicture data is adapted for presenting a data handler type being undefined in the standard.

* * * * *